(No Model.)

E. BOWLUS.
ARTIFICIAL TOOTH.

No. 522,400.                Patented July 3, 1894.

WITNESSES                              INVENTOR

A. B. Drqqes                          Edward Bowlus,

L. D. Heinrichs                by E. E. Masson Attorney.

UNITED STATES PATENT OFFICE.

EDWARD BOWLUS, OF FREDERICK, MARYLAND.

ARTIFICIAL TOOTH.

SPECIFICATION forming part of Letters Patent No. 522,400, dated July 3, 1894.

Application filed March 23, 1894. Serial No. 504,824. (No model.)

*To all whom it may concern:*

Be it known that I, EDWARD BOWLUS, a citizen of the United States, residing at Frederick, in the county of Frederick, State of Maryland, have invented certain new and useful Improvements in Securing Pins to Artificial Teeth, of which the following is a specification, reference being had therein to the accompanying drawings.

It is found from experience and practice in dentistry that when some of the teeth of a set become, while in daily use, separated from the rubber plate on which they are mounted; in about nine tenths of the cases, the pins (usually of platinum) break away or are detached from the body of the tooth, but that the opposite end of the pin remains solidly embedded in and secured to the plate. This happening is, it is believed, due to the unyielding nature of the flinty or porcelain material of the tooth in contact with the unyielding metal pin, which shears said pin or causes flakes of the porcelain to become chipped from the edge of the perforation in which the pin is inserted; said pins being generally inserted before the porcelain tooth is baked hard and glazed or enameled. The objects of my improvement are to remedy this defect by providing a cushion of rubber between the bottom and also the edges of said perforations and the pin; and also to provide of a material lighter, stronger or more rigid and less expensive than platinum, the pins used to connect the teeth to the gum plates, said material being aluminium, to which, I have found by experiments, the rubber adheres and vulcanizes even better than to platinum. I attain these objects by the construction illustrated in the accompanying drawings, in which—

Figure 1:
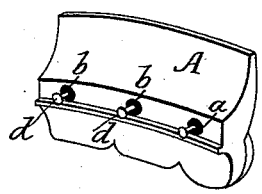
Figure 2:
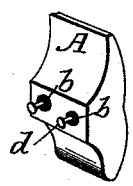
Figure 3:
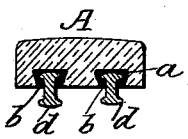
Figure 4:
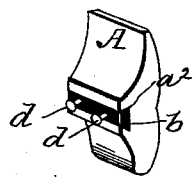

Figure 1 is a rear perspective view of a block of teeth having pins secured thereto in accordance with my invention. Fig. 2 is a rear perspective view of a tooth having pins secured thereto in rubber in accordance with my invention. Fig. 3 is a horizontal section of the same through the pins on a larger scale. Fig. 4 is a modification of the tooth shown in Fig. 3.

In said drawings A represents a tooth or block of teeth of porcelain in the rear of which are cavities $a$ in the form of truncated cones with their base toward the center of the tooth, or a dove-tailed groove $a^2$; said cavities or groove are made before the teeth are baked, the entrance to said cavities being of greater width than the inner head of the pin $d$, to be inserted therein, so as to leave around said inner head and body of the pin, and between them and the walls of the perforations, a space for the reception of a cushion $b$ of rubber.

To prepare the teeth in accordance with my invention porcelain teeth already baked and provided with truncated conical holes $a$, can be obtained from manufacturers, or teeth provided with a dove-tailed groove $a^2$ in the rear, are molded and baked; said holes or groove are then filled and packed with plastic rubber, one end of a double head pin $d$ of aluminium is then forced into the rubber, filling said holes or groove until said head nearly rests on the bottom thereof, the rubber is then packed between the body of the pin and the edge of the hole, and any rubber overtopping the rear of the tooth is trimmed off and removed. The tooth thus prepared is then placed in a vulcanizing apparatus and the pins retaining and cushioning rubber is vulcanized. The result is a tooth of the form preferred by dentists, viz: with headed pins projecting from its rear, but said pins made of aluminium and anchored in slightly yielding rubber that will adhere strongly to the rubber of which the mouth plates are usually made.

I am aware that the pins of teeth have been secured in cavities in the rear thereof by means of liquid glass or material resembling porcelain inserted therein and do not claim the use of said unyielding substances.

I am also aware that double head pins, twin-pins, and looped pieces of wire have been secured within the cavities made in teeth for their reception by forcing, if possible, a portion of the plastic rubber forming a part of the molded gum-plate or palate plate within said cavity after either one of said pins or fastening had been inserted in said cavity, and do not claim said construction or fastenings.

Having now fully described my invention, I claim—

1. As a new article of manufacture a baked and glazed artificial tooth having in the rear thereof a cavity wider in the bottom than at its edges, and within said cavity the head and a portion of the body of a pin, and in the rear and around said head and body a packing of rubber other than that of the palate plate and suitably vulcanized, whereby the metal of said pin is free from contact with the porcelain of the tooth substantially as described.

2. The method of producing artificial teeth provided with projecting fastenings, which consists in taking an artificial tooth having in the rear thereof a cavity wider in the bottom than at its edges, filling and packing said cavity with plastic vulcanizable rubber, forcing the head of a pin within said plastic rubber so that it will rest upon and be wholly inclosed in rubber and therefore free of metal contact with the porcelain, packing said rubber around the neck of said pin, trimming off and removing the excess of rubber from the edge of the cavity, and vulcanizing the packing within said cavity substantially as described.

In testimony whereof I affix my signature in presence of two witnesses.

EDWARD BOWLUS.

Witnesses:
SAML. G. DUVALL,
J. D. BAKER.